(12) United States Patent
Watanabe et al.

(10) Patent No.: US 7,385,022 B2
(45) Date of Patent: Jun. 10, 2008

(54) POLYTHIOCARBONATE POLYTHIOL

(75) Inventors: Masanori Watanabe, Ube (JP);
Masahiko Watanabe, Ube (JP);
Atsushi Morikami, Ube (JP);
Takafumi Hirakawa, Minato-ku (JP)

(73) Assignee: Ube Industries, Ltd. (JP)

( * ) Notice: Subject to any disclaimer, the term of this patent is extended or adjusted under 35 U.S.C. 154(b) by 0 days.

(21) Appl. No.: 11/649,536

(22) Filed: Jan. 4, 2007

(65) Prior Publication Data
US 2007/0129530 A1   Jun. 7, 2007

Related U.S. Application Data

(62) Division of application No. 11/587,362, filed as application No. PCT/JP2005/008550 on Apr. 28, 2005.

(30) Foreign Application Priority Data
Apr. 28, 2004   (JP)   ............... 2004-132766

(51) Int. Cl.
*C08F 6/00*   (2006.01)
(52) U.S. Cl. .................. 528/65; 436/500; 436/527; 436/530; 528/65
(58) Field of Classification Search ............... 436/500, 436/527, 530; 528/65
See application file for complete search history.

(56) References Cited

U.S. PATENT DOCUMENTS 6,943,211 B1 * 9/2005 Hubbell et al. .............. 524/556

FOREIGN PATENT DOCUMENTS

| JP | 60-199016 A | 10/1985 |
|----|---|---|
| JP | 4-58489 A | 2/1992 |
| JP | 05-148340 A | 6/1993 |
| JP | 06-116337 A | 4/1994 |
| JP | 08-302010 A | 11/1996 |
| JP | 09-184901 A | 7/1997 |
| JP | 11-228697 A | 8/1999 |
| JP | 11-292969 A | 10/1999 |
| JP | 2001-011182 A | 1/2001 |
| JP | 2002-080594 A | 3/2002 |
| JP | 2002-201277 A | 7/2002 |
| JP | 2005-008678 A | 1/2005 |
| JP | 2005-029608 A | 2/2005 |

OTHER PUBLICATIONS

F. Pilati et al., "Aliphatic poly(dithiocarbonate)s: synthesis and thermal properties," Polymer Communications, vol. 31, pp. 431-433, Nov. 1990.
E. Marianucci et al., "Refractive index of poly(thiocarbonate)s and poly(dithiocarbonate)s," Polymer Report, vol. 35, No. 7, pp. 1564-1566, 1994.

* cited by examiner

*Primary Examiner*—Terressa M Boykin
(74) *Attorney, Agent, or Firm*—DLA Piper US LLP

(57) ABSTRACT

Disclosed is a polythiocarbonate polythiol including repeating units represented by the chemical formula (I):

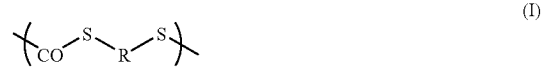

in which formula (I), R represents a divalent hydrocarbon group, which hydrocarbon group may have at least one substituent which does not take part in a reaction with the polyisocyante component and the carbon chain in the hydrocarbon group may include at least one member selected from hetero atoms and an —OCO— group, and the polythiocarbonate polythiol has a number average molecular weight of 200 to 2500.

9 Claims, No Drawings

POLYTHIOCARBONATE POLYTHIOL

RELATED APPLICATION

This application is a divisional of application Ser. No. 11/587,362, filed Oct. 25, 2006, which is a §371 of International Application No. PCT/JP2005/008550, with an international filing date of Apr. 28, 2005 (WO 2005/105883 A1, published Nov. 10, 2005), which is based on Japanese Patent Application No. 2004-132766, filed Apr. 28, 2004.

TECHNICAL FIELD

The disclosure relates to a polythiourethane which is useful as an optical plastic material, more particularly, a polythiourethane containing a polythiocarbonate polythiol as a polythiol component thereof. A polythiourethane has superior optical characteristics in the form of having a high refractive index and low dispersion, and is useful as a raw material of plastic lenses, prisms, optical fibers, substrates for information recording, colored filters, infrared absorbing filters and the like.

BACKGROUND

Because plastic materials are typically light, have considerable toughness and are easily dyed, they have come to be used in lenses and various other optical applications in recent years. However, in the case of using plastic materials in applications such as eyeglass lenses, if the refractive index is low, the thickness of the corresponding lenses increases considerably with an increase in the desired diopter value. As this also increases the weight, there is the problem of it being difficult to take advantage of the characteristic of plastic materials of being light. In addition, as plastic materials also have the characteristic of the Abbe number becoming lower the higher the refractive index, which tends to increase color aberration, there is the problem that this large color aberration causes viewed objects to become colored and appear blurred. In consideration of these problems, there is a need to develop a material for use as an optical plastic material having both a high refractive index and high Abbe number.

Examples of such optical plastic materials include a polythiourethane obtained by reacting a polythiol and polyisocyanate as disclosed in Japanese Examined Patent Publication No. H4-58489, and the use of a polythiol component of a polythiourethane having a high sulfur content as disclosed in Japanese Unexamined Patent Publication No. H5-148340. In addition, Japanese Unexamined Patent Publication No. 2001-11182 discloses a polythiourethane obtained by ring-opening polymerization of a cyclic thiocarbamate compound. Since these polythiourethanes of the prior art generally have a high refractive index of 1.6 or more, and a high Abbe number of about 30, they are frequently used in thin, lightweight eyeglass lenses.

However, polythiourethane had problems which could not be ignored in terms of practical use such as the strength with respect to a load such as tension, bending or impact (dynamic performance) becoming lower the higher the refractive index thereof. For example, as eyeglass lenses and the like are required to have optical performance in terms of high refractive index and high Abbe number as previously described, as well as dynamic performance in terms of superior tensile characteristics and high elasticity (high elongation percentage, high shape recovery), there has been a desire to develop a plastic material capable of satisfying both of these types of performance.

On the other hand, thiocarbonate plastic materials have been proposed as optical plastic materials having both a high refractive index and high Abbe number. For example, Japanese Unexamined Patent Publication No. H6-116337 discloses a polymer of a thiocarbonate compound having a vinylphenyl group on a terminal thereof and a polythiol compound, while Japanese Unexamined Patent Publication No. H11-228697 discloses a thiocarbonate sulfur-containing polymer obtained by ring-opening polymerization of a cyclic thiocarbonate compound. However, the former has problems such as the production process itself of the raw material thiocarbonate being complex, the refractive index of the resulting polymer being only slightly greater than 1.6, and the refractive index of the polythiourethane not being improved, while the latter has problems such as the specific physical properties of the resulting sulfur-containing polymer being unknown and the types of resulting sulfur-containing polymers being limited because the raw material is limited to specific cyclic compounds (namely, specific cyclic compounds having a small number of carbon atoms).

In addition, Japanese Unexamined Patent Publication No. H11-292969 discloses a thiocarbonate polymer obtained by ring-opening polymerization of a heterocyclic compound obtained by reacting carbon disulfide with an epoxy compound (such as propylene oxide), a thiocarbonate polymer obtained by ring-opening polymerization of a heterocyclic compound obtained by reacting a carbonic acid ester with a compound having a hydroxyl group and thiol group in a molecule thereof, and a thiocarbonate polymer obtained by reacting the aforementioned heterocyclic compound with a poly active hydrogen compound, as examples of thiocarbonate plastic materials having a high refractive index and superior mechanical strength. However, as all of these polymers use a heterocyclic compound for the raw material, there are restrictions on the type of raw material, thereby resulting in the problem of limitations on the types of polymers which can be obtained, as well. In addition, Japanese Unexamined Patent Publication No. H11-292969 only specifically discloses the initial open-ring polymer of the heterocyclic compound, while the physical properties of other polymers are unknown.

Moreover, a polythiocarbonate obtained by reacting phosgene and an alkane dithiol is disclosed as a plastic material having a high refractive index in Polymer, 35, 7, 1564 (1994) and Polymer Communications, 1990, 31, 431. However, this polythiocarbonate was not suitable as a raw material for obtaining polythiourethane having superior optical and dynamic performance since the polythiocarbonate is produced by using phosgene which is highly toxic, as a raw material, has a high molecular weight and is provided with chlorine atoms on the terminals thereof.

It could therefore be helpful to provide a polythiourethane provided with the performance required of an optical plastic material to be for eyeglass lenses and similar applications, and a particularly superior optical performance (high refractive index and high Abbe number), as well as a superior dynamic performance such as superior tensile characteristics and high elasticity (high elongation percentage and shape recovery).

SUMMARY

The disclosure relates a polythiocarbonate polythiol including repeating units represented by the chemical formula (I):

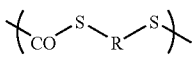
(I)

in which formula (I), R represents a divalent hydrocarbon group, which hydrocarbon group may have at least one substituent which does not take part in a reaction with the polyisocyante component and the carbon chain in the hydrocarbon group may include at least one member selected from hetero atoms and an —OCO— group, and the polythiocarbonate polythiol has a number average molecular weight of 200 to 2500.

The disclosure also relates the polythiocarbonate polythiol including repeating units represented by the chemical formula (I), including two or more types of repeating units, each represented by the formula (I).

The disclosure further relates the polythiocarbonate polythiol including repeating units represented by the chemical formula (I), including two or more types of repeating units each represented by the formula (I), in the state of a liquid at room temperature.

The disclosure also further relates the polythiocarbonate polythiol including repeating units represented by the chemical formula (I), including two or more types of repeating units each represented by the formula (I), having terminal aryloxy groups in an amount of 0 to 5 molar % based on the total molar amount of all terminal groups.

The disclosure still further relates the polythiocarbonate polythiol including repeating units represented by the chemical formula (I), including two or more types of repeating units each represented by the formula (I), having a color represented by APHA No. 60 or less.

The disclosure further yet relates the polythiocarbonate polythiol including repeating units represented by the chemical formula (I), including two or more types of repeating units each represented by the formula (I), wherein the molar content of thioether structures generated by a COS-removal reaction of the thiocarbonate structure portions in the polythiocarbonate polythiol is 3% or less of the total amount, in moles, of the non-reacted thiocarbonate structures and the generated thioether structures.

The disclosure further still relates the polythiocarbonate polythiol including repeating units represented by the chemical formula (I), including two or more types of repeating units each represented by the formula (I), produced by a transesterification reaction of diphenyl carbonate with a polythiol compound including a divalent hydrocarbon group having 4 to 14 carbon atoms, in the presence of a transesterification catalyst.

The disclosure further also relates the polythiocarbonate polythiol including repeating units represented by the chemical formula (I), including two or more types of repeating units each represented by the formula (I), being one produced by a transesterification reaction of diphenyl carbonate with a polythiol compound including a divalent hydrocarbon group having 4 to 14 carbon atoms, in the presence of a transesterification catalyst, wherein the content for the residual transesterification catalyst is limited to 10 ppm or less, on the basis of the total mass of the resultant polythiocarbonate polythiol.

The disclosure yet again relates the polythiocarbonate polythiol including repeating units represented by the chemical formula (I), including two or more types of repeating units each represented by the formula (I), being one produced by a transesterification reaction of diphenyl carbonate with a polythiol compound including a divalent hydrocarbon group having 4 to 14 carbon atoms, in the presence of a transesterification catalyst, wherein the transesterification catalyst includes a basis component.

DETAILED DESCRIPTION

A polythiourethane is obtained by reacting a polythiol component comprising at least one polythiocarbonate polythiol, and a polyisocyanate component comprising a polyisocyanate and/or polyisothiocyanate. In addition, the polythiocarbonate polythiol contained in the polythiol component is preferably obtained by a transesterification reaction between a carbonate compound and a polythiol compound.

Examples of the carbonate compound used as a raw material for producing a polythiocarbonate polythiol include dialkyl carbonates such as dimethyl carbonate, diethyl carbonate, di-n-butyl carbonate and diisobutyl carbonate; diaryl carbonates such as diphenyl carbonate; alkylene carbonates such as ethylene carbonate and propylene carbonate; and, alkyl aryl carbonates such as methyl phenyl carbonate. Among these carbonate compounds, diaryl carbonates are used preferably, and diphenyl carbonate is used more preferably.

Examples of the polythiol compound used as a raw material for producing a polythiocarbonate polythiol include polythiol compounds corresponding to polyol compounds used in the production of known polycarbonate polyols and so forth, specific examples of which include compounds in which the terminal group of a polyvalent (and at least divalent) hydrocarbon group is composed of a mercapto group. This hydrocarbon group may be an aliphatic (including alicyclic) hydrocarbon group (preferably having 2 to 14 carbon atoms), or an aromatic (including aliphatic hydrocarbon substituents or aliphatic hydrocarbon structures) hydrocarbon group (preferably having 6 to 14 carbon atoms). In addition, the polyvalent hydrocarbon group may also have substituents (such as alkyl groups or nitro groups) which do not take part in the reaction for forming the polythiocarbonate polythiol. In addition, the main hydrocarbon chain of the polyvalent hydrocarbon group may contain one or more members selected from one or more heteroatoms (such as oxygen, sulfur or nitrogen atoms) and an —OCO— group. In the case the polyvalent hydrocarbon group is a divalent hydrocarbon group, group R in the chemical formulas (I) and (II) corresponds to this divalent hydrocarbon group.

Examples of polythiol compounds containing an aliphatic hydrocarbon group for the hydrocarbon group include alkane dithiols such as 1,2-ethane dithiol, 1,3-propane dithiol, 1,4-butane dithiol, 1,5-pentane dithiol, 1,6-hexane dithiol, 1,7-heptane dithiol, 1,8-octane dithiol, 1,9-nonane dithiol, 1,10-decane dithiol, 1,12-dodecane dithiol, 2,2-dimethyl-1,3-propane dithiol, 3-methyl-1,5-pentane dithiol and 2-methyl-1,8-octane dithiol; cycloalkane dithiols such as 1,4-cyclohexane dithiol and 1,4-bis(mercaptomethyl) cyclohexane; alkane dithiols containing heteroatoms such as 2-mercaptoethyl ether, 2-mercaptoethyl sulfide, 2-mercaptoethyl disulfide and 2,2'-(ethylenediothio) diethanethiol; cycloalkane dithiols containing heteroatoms such as 2,5-bis(mercaptomethyl)-1,4-dioxane and 2,5-bis(mercaptomethyl)-1,4-dithiane; alkane trithiols such as 1,1,1-tris(mercaptomethyl)ethane and 2-ethyl-2-mercaptomethyl-1,3-propane dithiol; alkane tetrathiols such as tetraquis (mercaptomethyl)methane, 3,3'-thiobis(propane-1,2-dithiol)

and 2,2'-thiobis(propane-1,3-dithiol); and, alkane tetraquis (mercaptoalkylates) such as pentaerythritol tetraquis(mercaptopropionate) and pentaerythritol tetraquis (mercaptoacetate).

In addition, examples of polythiol compounds containing an aromatic hydrocarbon group used for the polyvalent hydrocarbon group include arene dithiols (aromatic dithiols) such as 1,2-benzene dithiol, 1,3-benzene dithiol, 1,4-benzene dithiol, 1,2-bis(mercaptomethyl) benzene, 1,3-bis(mercaptomethyl)benzene, 1,4-bis(mercaptomethyl)benzene and toluene-3,4-dithiol; and, arene trithiols (aromatic trithiols) such as 1,3,5-benzene trithiol and 1,3,5-tris (mercaptomethyl)benzene.

The polythiol component for producing the polythiocarbonate polythiol may be composed of only one type of polythiol compound, or a plurality (at least two types) of polythiol compounds may be used in combination. In the case of the latter, when the polyvalent hydrocarbon group in the polythiol compound is a divalent hydrocarbon group, the resulting polythiocarbonate polythiol has a plurality of types (at least two types) of repeating units represented by the chemical formula (I) (copolymer), and if a combination of polythiol compounds as indicated below is used, a polythiocarbonate polythiol can be obtained which has a low melting point and crystallization temperature, and is in a liquid state at room temperature (10 to 40° C.). Examples of combinations of the polythiol compounds are indicated below. This type of liquid polythiocarbonate polythiol can be polymerized by liquid injection polymerization at room temperature, thereby making it extremely useful in practical terms:

(1) Combinations of two types of aliphatic linear dithiol compounds having different carbon chain lengths such as a combination of 1,5-pentane dithiol and 1,6-hexane dithiol, and a combination of a mercaptoalkyl sulfide (such as 2-mercaptoethyl sulfide) and 1,6-hexane dithiol;

(2) Combinations of aliphatic linear dithiols and aliphatic branched polythiols such as a combination of 1,6-hexane dithiol and 3-methyl-1,5-pentane dithiol;

(3) Combinations of aliphatic linear dithiols or aliphatic branched dithiols and alkane dithiols having an aliphatic hydrocarbon ring such as a combination of 1,6-hexane dithiol and 1,4-bis(mercaptomethyl) cyclohexane; and (4) Combinations of aliphatic linear dithiols or aliphatic branched dithiols and alkane dithiols having a heteroatom and aliphatic hydrocarbon ring such as a combination of 1,6-hexane dithiol and 2,5-bis(mercaptomethyl)-1,4-dithiane.

The polythiocarbonate polythiol is preferably produced by a transesterification reaction between a carbonate compound (and particularly a diaryl carbonate) and a polythiol compound in the presence of a transesterification catalyst while removing the by-product alcohols produced (and particularly aryl alcohols) outside the system. At this time, the polythiol compound is preferably used in an amount equal to 0.8 to 3.0 times, more preferably at 0.85 to 2.5 times, and even more preferably at 0.9 to 2.5 times, in moles, the amount of the carbonate compound so that all or nearly all of the molecular chain terminals of the resulting polythiocarbonate polythiol are composed of mercapto groups. In addition, the amount of transesterification catalyst used is preferably 1 to 5000 ppm, and more preferably 10 to 1000 ppm, based on the molar amount of the polythiol compound.

In the transesterification reaction, diphenyl carbonate is preferably used for the diaryl carbonate, and in this case, a polythiol compound having a divalent hydrocarbon group for polyvalent hydrocarbon group R is used preferably. In addition, the number of carbon atoms of the divalent hydrocarbon group R is preferably 4 to 14. At this time, the amount used of the polythiol compound having a divalent hydrocarbon group R containing 4 to 14 carbon atoms is preferably 1.05 to 3 times and more preferably 1.1 to 2.5 times, in moles, the molar amount of diphenyl carbonate. As a result, a polythiocarbonate polythiol can be easily obtained having low color (namely an APHA No. of preferably 60 or less, more preferably 40 or less and even more preferably 20 or less), and in which all or nearly all of the terminals of the polythiol compound molecular chain are mercapto groups (namely, the content ratio of aryloxy groups (and particularly phenoxy groups) which form terminal groups is preferably 0 to 5%, more preferably 0 to 2%, and particularly preferably 0 to 1%). A polythiourethane having superior optical performance as well as superior dynamic performance can be obtained by controlling the content ratio of aryloxy groups among the terminal groups to be close to zero in this manner. Furthermore, the APHA number indicates the color of the polythiocarbonate polythiol when melted by heating, and the content ratio of aryloxy groups of this compound is measured on the basis of moles (to apply similarly hereinafter).

Although there are no extraordinary limitations on the conditions (temperature, pressure, time) of the transesterification reaction provided the target substance can be produced, the carbonate compound and the polythiol compound are preferably supplied to a multi-stage reaction in the presence of a transesterification catalyst so as to enable the target substance to be produced efficiently, the reaction is carried out, for example, for about 1 to 24 hours at normal pressure or reduced pressure and at a temperature of 110 to 200° C., then for about 0.1 to 20 hours under reduced pressure at a temperature of 110 to 240° C. (and particularly 140 to 240° C.), and finally for about 0.1 to 20 hours at the same temperature while gradually increasing the degree of vacuum so that the final pressure is 2.7 kPa (20 mmHg) or less. In addition, in the case of using a plurality, for example x, types of polythiol compounds, the transesterification reaction may be carried out between the carbonate component and y (<x) types of polythiol compounds under the same conditions as described above to produce the polythiocarbonate polythiol, followed by reacting the remaining (x-y) types of polythiol compounds therewith to produce a desired polythiocarbonate polythiol. At this time, in the case the carbonate compound is diphenyl carbonate, a transesterification reaction can first be carried out between the diphenyl carbonate and a polythiol compound having a hydrocarbon group R containing 4 to 14 carbon atoms, followed by carrying out a transesterification reaction between the resulting polythiocarbonate polythiol and a polythiol compound having a hydrocarbon group R containing 2 to 4 carbon atoms, to produce the target compound. Furthermore, the reactor is preferably provided with a distillation device to remove by-product alcohols, and more preferably, the reaction is carried out while allowing an inert gas (such as nitrogen, helium or argon) to flow into the reactor.

There are no extraordinary limitations on the transesterification catalyst provided it is an effective catalytic compound for a transesterification reaction. Examples of catalytic compounds which can be selected include basic compounds such as potassium carbonate, sodium alkoxides (such as sodium methoxide and sodium ethoxide) and quaternary ammonium salts (such as tetrabutyl ammonium hydroxide and other tetraalkyl ammonium hydroxides); titanium compounds such as titanium tetrachloride and tetraalkoxy titanium (such as tetra-n-butoxytitanium and tetraisopropoxytitanium); and, tin compounds such as tin metal, tin hydroxide, tin chloride, dibutyl tin dilaurate, dibutyl tin oxide and butyl tin tris(2-ethylhexanoate).

Among the transesterification catalysts, basic compounds such as potassium carbonate, sodium alkoxides (such as sodium methoxide and sodium ethoxide) and quaternary ammonium salts (such as tetrabutyl ammonium hydroxide and other tetraalkyl ammonium hydroxides), and tetraalkoxy titanium (such as tetra-n-butoxytitanium and tetraisopropoxytitanium, etc.) are used preferably. In particular, those basic compounds capable of providing a high-quality polythiocarbonate polythiol for which the reaction rate is fast, the resulting produced compound has low color of an APHA No. of 60 or less, and the content ratio of thioether structures (—R—S—R—) formed by a COS-removal reaction of thiocarbonate structure (—CO—S—) portions based on the molar amount (to apply similarly hereinafter) is 3% or less of the total molar amount of unreacted thiocarbonate structures and the thioether structures, are particularly preferable. Among the basic compounds, quaternary ammonium salts (and particularly tetraalkyl ammonium hydroxides such as tetrabutyl ammonium hydroxide) are more preferable since they provide polycarbonate polythiols having an APHA No. of 60 or less and a content ratio of the thioether structures of 1% or less, and which are free of metal components. The optical and dynamic performance of the resulting polythiourethane can be maintained at a high level by controlling the content ratio of the thioether structures to be as low as possible.

A polythiocarbonate polythiol having a number average molecular weight (Mn) of 200 to 2,500 is preferably selected for the polythiocarbonate polythiol, while that having a number average molecular weight of about 400 to 2,000 is selected more preferably. If the molecular weight is outside the range of 200 to 2,500, a polythiourethane obtained from this polythiocarbonate polythiol is inadequate in terms of the dynamic performance thereof. Namely, if the number average molecular weight of the polythiocarbonate polythiol is lower than 200, the fracture elongation percentage of the resulting polythiourethane is inadequate, while in the case the number average molecular weight is higher than 2500, the shape recovery of the resulting polythiourethane decreases. Consequently, the respective amounts of carbonate compound and polythiol compound used are suitably adjusted so as to obtain the target molecular weight. In the case the number average molecular weight as calculated from the mercapto group value of the reaction product is outside the aforementioned range of 200 to 2500, namely, in the case the molecular weight is less than 200, it is preferable to allow the transesterification reaction to proceed while further distilling off polythiol compounds under reduced pressure, and in the case the molecular weight exceeds 2500, it is preferable to adjust the molecular weight to a suitable value by further carrying out the transesterification reaction by adding a polythiol compound. As a result, the polythiocarbonate polythiol can be adjusted to the target molecular weight. Furthermore, "n" in the aforementioned chemical formula (II) represents an integer, of 1 or more, representing the degree of polymerization of the polythiocarbonate polythiol compound, and is related to the molecular weight thereof.

As was previously described, the transesterification catalyst remaining in the polythiocarbonate polythiol is preferably deactivated following adjustment of molecular weight, as necessary. In the case of using tetraalkoxy titanium, deactivation of the transesterification catalyst can be carried out by a known method consisting of the addition of a phosphorous compound (such as phosphoric acid, butyl phosphate or dibutyl phosphate). In the case of using a basic compound for the catalyst, deactivation can be carried out by adding an inorganic or organic acid (such as sulfuric acid or paratoluene sulfonic acid) in an equimolar amount to the catalyst while heating to 40 to 150° C. Furthermore, when an insoluble salt precipitates as a result of this addition of acid, it is preferably removed by washing.

Furthermore, the color (APHA No.) of the polythiocarbonate polythiol can be further lowered by washing. For example, in the case of using tetraalkyl ammonium hydroxide for the catalyst, although the APHA number of the resulting polythiocarbonate polythiol is already 60 or less, this can be further lowered to 40 or less, or even 20 or less (and preferably 10 or less) by the aforementioned washing. In addition, in the case of using a titanium compound for the catalyst as well, although the APHA number of the resulting polythiocarbonate polythiol normally exceeds 100, this can be lowered in the same manner as described above by washing. Furthermore, washing can be carried out by dissolving the polythiocarbonate polythiol in a good solvent such as methylene chloride, adding a suitable amount of water thereto, and uniformly mixing or stirring. This procedure may be repeated a plurality of times as necessary. In addition, regardless of whether a basic compound or titanium compound is used for the catalyst, the amount of catalyst remaining in the polythiocarbonate polythiol can be reduced to 10 ppm or less (and even to 2 ppm or less) based on weight (to apply similarly hereinafter). As a result of controlling the amount of remaining catalyst to a low level, the optical and dynamic performance of the resulting polythiocarbonate polythiol can be improved.

As previously described, a desired polythiocarbonate polythiol can be easily produced by transesterifying a polycarbonate compound and a polythiol compound in the presence of a transesterification catalyst. In this type of polythiocarbonate polythiol, particularly when the polythiol compound is a compound in which mercapto groups are bound to both terminals of a divalent hydrocarbon group (namely, a dithiol compound), the polythiocarbonate polythiol has one or more types of repeating units represented by the aforementioned chemical formula (I), and the number average molecular weight thereof is preferably 200 to 2500, and more preferably 400 to 2000. In addition, a polythiocarbonate polythiol has low color (APHA number of preferably 60 or less, more preferably 40 or less and even more preferably 20 or less), and all or nearly all of the molecular terminals are occupied by mercapto groups (the content ratio of aryloxy groups present on molecular terminals is preferably 0 to 5%, more preferably 0 to 2%, and particularly preferably 0 to 1%, of the total molar amount of all terminal groups). Moreover, a polythiocarbonate polythiol has a low proportion of thioether structures formed by a COS-removal reaction of thiocarbonate structural portions (the total molar amount of residual thiocarbonate structures and the aforementioned thioether structures is preferably 3% or less), and the amount of catalyst remaining is preferably 10 ppm or less and more preferably 2 ppm or less.

A polythiourethane is obtained by reacting a polythiol component comprising at least one of the aforementioned polythiocarbonate polythiols with a polyisocyanate component comprising at least one member selected from polyisocyanates and polyisothiocyanates (namely, by a reaction for converting a polythiocarbonate polythiol to a polythiourethane). At this time, the polyisocyanate component may be composed of a single compound or a mixture of two or more types of compounds.

A polyisocyanate used in the production of polyurethane can be used for the polyisocyanate for the polyisocyanate component, specific examples of which include compounds in which an isocyanate group is bound to the free terminal of a polyvalent (and at least divalent) hydrocarbon group. The polyvalent hydrocarbon group may be an aliphatic hydrocarbon group (preferably having 2 to 14 carbon atoms, and including alicyclic hydrocarbon groups), or an aromatic hydrocarbon group (preferably having 6 to 14 carbon atoms, and which may contain an aliphatic hydrocarbon substituent or aliphatic hydrocarbon structure). In addition, the polyisocyanate may have one or more substituents which do not take part in the reaction with the polythiol component (such as alkyl groups or nitro groups), and one or more heteroatoms (such as an oxygen atom, sulfur atom or nitrogen atom) may be contained in the carbon chain thereof. When the hydrocarbon group is a divalent hydrocarbon group, "Y" in the aforementioned chemical formula (II) corresponds to a divalent hydrocarbon group derived from the polyisocyanate component.

Examples of compounds which can be used for the polyisothiocyanate for the polyisothiocyanate component include polyisothiocyanate compounds corresponding to the aforementioned polyisocyanate compounds.

Polyisocyanate compounds include various types of aliphatic or aromatic polyisocyanates. Examples of aliphatic polyisocyanates include alkane polyisocyanates such as 1,3-trimethylene diisocyanate, 1,4-tetramethylene diisocyanate, 1,6-hexamethylene diisocyanate, 2,2,4-trimethyl-1,6-hexamethylene diisocyanate, 2,4,4-trimethyl-1,6-hexamethylene diisocyanate, 1,9-nonamethylene diisocyanate and 1,10-decamethylene diisocyanate; cycloalkane polyisocyanates such as 1,4-cyclohexane diisocyanate, 4,4'-dicyclohexylmethane diisocyanate, hydrogenated xylene diisocyanate and 1,3,5-tris(isocyanomethyl) cyclohexane; alkane polyisocyanates containing a heteroatom such as 2,2'-diethylether diisocyanate, 2,2'-diethylsulfide diisocyanate, hexamethylene diisocyanate biuret, 2-isocyanoethylthio-1,3-isocyanopropane, 1,1-bis(isocyanomethylthio)-4-isocyanobutane, 3,3-bis(isocyanoethylthio)-1-isocyanobutane and 2,3-bis(isocyanoethylthio)-1-isocyanomethylthiopropane; and, cycloalkane polyisocyanates having a heteroatom such as isophorone diisocyanate, 1,4-dithiane-2,5-diisocyanate, 2,3-bis(isocyanomethyl)-1,4-dithiane, 2,5-bis(isocyanomethyl)-1,4-dithiane, 2,5-bis(isocyanoethyl)-1,4-dithiane, cyclopentane-1,3-disulfide-4,5-diisocyanate, 4,5-bis(isocyanomethyl) cyclopentane-1,3-disulfide, 2-methyl-4,5-bis (isocyanomethyl)cyclopentane-1,3-disulfide, 2,2-bis (isocyanopropyl)cyclopentane-1,3-disulfide, tetrahydrothiophene-2,5-diisocyanate, 2,5-bis(isocyanomethyl)tetrahydrothiophene and 3,4-bis(isocyanomethyl)tetrahydrothiophene.

In addition, examples of aromatic polyisocyanates include p-phenylene diisocyanate, 4,4'-diphenyl diisocyanate, 1,5-naphthalene diisocyanate, tolylene diisocyanate (TDI), xylylene diisocyanate (XDI), 4,4'-diphenylmethane diisocyanate (MDI), 3,3'-methyleneditolylene-4,4'-diisocyanate, tolylene diisocyanate trimethylol propane adduct, 4,4'-diphenylether diisocyanate, tetrachlorophenylene diisocyanate, 3,3'-dichloro-4,4'-diphenylmethane diisocyanate, triphenylmethane triisocyanate, 1,3,5-tris(isocyanomethyl) benzene and triisocyanate phenylthiophosphate.

The polyisocyanate compounds include polyisothiocyanates corresponding to the aforementioned polyisocyanate compounds.

In the production of a polythiourethane, one or more types of chain lengtheners can be used as a hard segment in the polythiourethane conversion reaction. Chain lengtheners ordinarily used in the production of polyurethane can be used for the chain lengthener. Examples of compounds able to be used as a chain lengthener include low molecular weight compounds having at least two hydrogen atoms reactable to isocyanate groups and/or isothiocyanate groups, specific examples of which include polyol compounds, polythiol compounds and polyamine compounds.

Examples of polyol compounds used for the aforementioned chain lengthener include aliphatic polyols such as ethylene glycol, 1,2-propylene glycol, 1,3-propanediol, 1,3-butanediol, 1,4-butanediol, 1,5-pentanediol, 1,6-hexanediol, 1,8-octanediol, 1,9-nonanediol, 1,10-decanediol, 1,12-dodecanediol, neopentyl glycol, 3-methyl-1,5-pentanediol, 3,3-dimethylol heptane, 1,4-cyclohexanediol, 1,4-cyclohexane dimethanol, 1,4-bis(hydroxyethyl) cyclohexane, 2-hydroxyethyl ether, 2-hydroxyethyl sulfide, 2,5-bis(hydroxymethyl)-1,4-dioxane, 2,5-bis(hydroxylmethyl)-1,4-dithane, trimethylol ethane, trimethylol propane and pentaerythritol; and, aromatic polyols such as catechol, resorcinol, hydroquinone, 1,3,5-benzenetriol, 1,2-bis(hydroxymethyl) benzene, 1,3-bis(hydroxymethyl)benzene, 1,4-bis(hydroxymethyl)benzene and 1,3,5-tris (hydroxymethyl)benzene.

Examples of polythiol compounds used for the aforementioned chain lengthener include aliphatic polythiols such as 1,2-ethane dithiol, 1,2-propane dithiol, 1,3-propane dithiol, 1,4-butane dithiol, 1,5-pentane dithiol, 1,6-hexane dithiol, 1,7-heptane dithiol, 1,8-octane dithiol, 1,9-nonane dithiol, 1,10-decane dithiol, 1,12-dodecane dithiol, 2,2-dimethyl-1,3-propane dithiol, 3-methyl-1,5-pentane dithiol, 2-methyl-1,8-octane dithiol, 1,4-cyclohexane dithiol, 1,4-bis(mercaptomethyl)cyclohexane, 2-mercaptoethyl ether, 2-mercaptoethyl sulfide, 2-mercaptoethyl disulfide, 2,5-bis (mercaptomethyl)-1,4-dioxane, 2,5-bis(mercaptomethyl)-1,4-dithiane, 1,1,1-tris(mercaptomethyl)ethane, 2-ethyl-2-mercaptomethyl-1,3-propane dithiol, tetraquis (mercaptomethyl)methane, 3,3'-thiobis(propane-1,2-dithiol), 2,2'-thiobis(propane-1,3-dithiol), pentaerythritol tetraquis(mercaptopropionate) and pentaerythritol tetraquis (mercaptoacetate); and, aromatic polythiols such as 1,2-benzene dithiol, 1,3-benzene dithiol, 1,4-benzene dithiol, 1,3,5-benzene trithiol, 1,2-bis(mercaptomethyl)benzene, 1,3-bis(mercaptomethyl)benzene, 1,4-bis(mercaptomethyl) benzene, 1,3,5-tris(mercaptomethyl)benzene and toluene-3,4-dithiol.

Examples of polyamine compounds used for the aforementioned chain lengthener include aliphatic polyamines such as ethylene diamine, 1,2-propylene diamine, 1,6-hexamethylene diamine, isophorone diamine, bis(4-aminocyclohexyl)methane and piperazine; and, aromatic polyamines such as meta- (and para-)xylylene diamine.

Moreover, other examples of compounds able to be used as a chain lengthener include aliphatic and aromatic amino alcohols such as 2-ethanol amine, N-methyldiethanol amine and N-phenyldipropanol amine; hydroxyalkyl sulfamides such as hydroxyethyl sulfamide and hydroxyethyl aminoethyl sulfamide; mercaptoalcohols such as 2-mercaptoethanol, 1,2-dihydroxy-3-mercaptopropane, 2,3-dimercapto-1-propanol and 4-mercaptophenol; aminothiols such as aminoethyl mercaptans; 2-aminothiophenol, 3-aminothiophenol and 4-aminothiophenol; urea; and, water.

In addition, in the polythiourethane conversion reaction, one or more types of polycarbonate polyols produced from a polyol compound and a carbonate compound may be used in place of a portion (50% by weight or less) of the aforementioned polythiol component. A polycarbonate polyol having, in the aforementioned formula (I), at least one repeating unit in which a sulfur atom is substituted with an oxygen atom and two or more hydroxyl groups on the molecular terminals thereof, is used for this type of polycarbonate polyol.

Examples of polyol compounds serving as raw materials of the aforementioned polycarbonate polyol include aliphatic polyols such as ethylene glycol, 1,2-propylene glycol, 1,3-propanediol, 1,3-butanediol, 1,4-butanediol, 1,5-pentanediol, 1,6-hexanediol, 1,8-octanediol, 1,9-nonanediol, 1,10-decanediol, 1,12-dodecanediol, neopentyl glycol, 3-methyl-1,5-pentanediol, 3,3-dimethylol heptane, 1,4-cyclohexanediol, 1,4-cyclohexane dimethanol, 1,4-bis(hydroxyethyl) cyclohexane, 2-hydroxyethyl ether, 2-hydroxymethyl sulfide, 2,5-bis(hydroxymethyl)-1,4-dioxane, 2,5-bis(hydroxymethyl)-1,4-dithane, trimethylol ethane, trimethylol propane and pentaerythritol; and, aromatic polyols such as catechol, resorcinol, hydroquinone, 1,3,5-benzenetriol, 1,2-bis(hydroxymethyl)benzene, 1,3-bis(hydroxymethyl)benzene, 1,4-bis(hydroxymethyl) benzene and 1,3,5-tris(hydroxymethyl)benzene.

The polythiourethane conversion reaction may be carried out in the absence of a solvent, or in the presence of an inert solvent with respect to isocyanate groups and/or isothiocyanate groups. In the case of carrying out the reaction in the absence of a solvent, the polyisocyanate component composed of a polyisocyanate compound and/or a polyisothiocyanate compound is mixed into the polythiol component, optionally followed by further mixing with a chain lengthener and reacting the entire amount in a single step, or after preparing a pre-polymer containing an isocyanate group and/or isothiocyanate group by reacting the polythiol component with the polyisocyanate component, a chain lengthener is mixed therein and reacted, or a portion of the polyisocyanate component is mixed into the polythiol component and optionally a chain lengthener is mixed therein and reacted therewith to prepare a pre-polymer having a mercapto group, followed by mixing in and reacting the remainder of the polyisocyanate component to complete the polythiourethane conversion reaction. In the case of a reaction carried out in the absence of a solvent, the reaction temperature is preferably 60 to 150° C. Furthermore, in the case of using a multi-stage reaction passing through a pre-polymer, a low molecular weight prepolymer is first obtained, after which this can be heated to suitably increase the molecular weight thereof.

In the case of a reaction carried out in the presence of a solvent, after dissolving the polythiol component in a solvent (and mixing in a chain lengthener as necessary), the polyisocyanate component is mixed therein and the entire amount may be reacted all at once, or the polythiol component is dissolved in a solvent, the polyisocyanate component is mixed therein and reacted to produce a pre-polymer having an isocyanate group and/or isothiocyanate group followed by mixing in and reacting a chain lengthener, or after dissolving the polythiol component in a solvent (and mixing in a chain lengthener as necessary), a portion of the polyisocyanate component may be mixed therein and reacted to prepare a pre-polymer having a mercapto group followed by mixing in and reacting the remainder of the polyisocyanate component and carrying out the polythiourethane conversion reaction. In the case of reacting in the presence of a solvent, the reaction temperature is preferably 20 to 100° C. Furthermore, one or more types of solvents such as methyl ethyl ketone, ethyl acetate, toluene, dioxane, dimethylformamide, dimethylacetoamide or dimethylsulfoxide is preferably used for the solvent.

In the polythiourethane conversion reaction, the ratio of the amounts of polythiol component and the chain lengthener used is preferably within a range of 0 to 10 moles of the latter with respect to 1 mole of the former. The amounts of these components used is suitably set according to the desired physical properties of the target polythiourethane. In addition, a polyisocyanate component composed of a polyisocyanate compound and/or a polyisothiocyanate compound is preferably used such that the total amount of isocyanate groups and isothiocyanate groups is nearly equimolar to the total amount of active hydrogens of the polythiol component and chain lengthener. More specifically, the equivalent ratio of the total amount of active hydrogens contained in the polythiol component and chain lengthener to the total amount of isocyanate groups and isothiocyanate groups is controlled to be preferably 1:0.8 to 1:1.2, and more preferably to 1:0.95 to 1:1.05. Furthermore, in the polythiourethane conversion reaction, an amine or tin catalyst ordinarily used in polyurethane conversion reactions may be used to accelerate the reaction.

A polythiourethane obtained in this manner may be formed according to a molecular terminal thereof being a mercapto group or isocyanate and/or isothiocyanate group, or according to a terminal group of a chain lengthener (mercapto group, hydroxyl group, amino group, etc.).

In addition, a polythiourethane can be polymerized or reticulated by reacting with a compound having at least two hydrogen atoms which react with an isocyanate group and/or isothiocyanate group (such as a polythiol or polyamine), or a compound having at least two functional groups or substituents (such as a carboxyl group or halo group) which react with a molecular terminal group such as a mercapto group, hydroxyl group or amino group. Moreover, one or more types of various additives may be added and mixed with a polythiourethane of the present invention within a range which does not impair the effects of the present invention, examples of which include polyether, polythioether, polyester, polythioester, polyamide, polymethacrylate, polyolefin and polycarbonate.

The following provides a more detailed explanation using the following examples. Furthermore, the physical properties of the polythiocarbonate polythiol and polythiourethane were measured according to the methods indicated below.

Physical Properties of Polythiocarbonate Polythiol (1) Mercapto group value (SH value: mg KOH/g): A sample was placed into a 100 ml sample bottle and weighed (weight in grams read accurately to 4 decimal places), followed by the addition thereto of 5 ml of acetic anhydride-tetrahydrofuran solution (containing 4 g of acetic anhydride in 100 ml of solution) and 10 ml of 4-dimethylaminopyridine-tetrahydrofuran solution (containing 1 g of 4-dimethylaminopyridine in 100 ml of solution). After allowing the sample solution to stand for 1 hour at room temperature, 1 ml of ultra-pure water was added to this sample solution and this mixed solution was allowed to stand for 30 minutes at room temperature while stirring occasionally. This mixed solution was submitted to measurement of SH value and titrated with 0.25 M potassium hydroxide-ethanol solution (indicator: phenolphthalein). SH value was calculated according to the equation below:

$$SH\ \text{value}(\text{mgKOH/g}) = 14.025 \times (B-A) \times f/S$$

(wherein, S represents the sample weight (g), A represents the amount of 0.25 M potassium hydroxide-ethanol solution required to titrate the sample (ml), B represents the amount of 0.25 M potassium hydroxide-ethanol solution required in a blank test (ml), and f represents the factor of the 0.25 M potassium hydroxide-ethanol solution).

(2) Number average molecular weight ($M_n$): Number average molecular weight ($M_n$) was calculated from the SH value according to the following equation:

$$M_n = 112200/SH \text{ value.}$$

(3) Acid value (mgKOH/g): A sample was dissolved in 200 ml of a toluene-ethanol solution (equal volume mixed solution), and this solution was submitted for measurement of acid value and measured using 0.1 M potassium hydroxide-ethanol solution (indicator: phenolphthalein). The acid value was calculated according to the equation below:

$$\text{Acid value(mgKOH/g)} = 5.61(C-D) \times f'/S'$$

(wherein, S' represents the sample weight (g), C represents the amount of 0.1 M potassium hydroxide-ethanol solution required to titrate the sample (ml), D represents the amount of 0.1 M potassium hydroxide-ethanol solution required in a blank test (ml), and f' represents the factor of the 0.1 M potassium hydroxide-ethanol solution).

(4) Melting point (° C.) and crystallization temperature (° C.): Melting point and crystallization temperature were measured using a differential scanning calorimeter (Shimadzu: DSC-50) in a nitrogen gas atmosphere under conditions of a temperature range of −100 to 100° C., heating rate of 10° C./min and cooling rate of 10° C./min.

(5) Viscosity (mPa·sec): Viscosity was measured at 100° C. using an E-type rotational viscometer (Brookfield, Programmable Digital Viscometer Model DV-II+).

(6) Color (APHA No.): Color was measured in compliance with JIS-K1557. A test sample was melted and placed in a comparison tube having an inner diameter of 23 mm and volume of about 100 ml followed by comparing the color thereof with APHA standards nos. 10 to 500. The color of the sample was indicated according to the APHA standard which most closely approximated the color of the sample.

(7) Terminal aryloxy group (—OAr—) content ratio (mol %): The molar content ratio of terminal aryloxy groups relative to the total number of terminal groups was calculated from the integral values of $^1$H-NMR.

(8) Content ratio of thioether (—R—S—R—) structures formed by COS removal reaction (%): The total content of unreacted thioether structures and thiocarbonate structures formed by the COS removal reaction (moles) was determined from the integral values of $^1$H-NMR, and the content ratio of the thioether structures relative to that total amount was determined.

(9) Amount of residual catalyst (ppm): A 30% chloroform solution was prepared from a polythiocarbonate polythiol sample, the tetrabutyl ammonium hydroxide in the solution was extracted using an equal volume of water, and this was applied to high-performance liquid chromatography to measure the amount of residual catalyst (ppm).

Physical Properties of Polythiourethane (1) Tensile characteristics: A test piece was produced in compliance with JIS-K7311 and this was placed in a tensile tester (Orientec, Tensilon UCT-5T) followed by measurement of initial modulus of elasticity, tensile stress (stress at 100%, 200% and 300% elongation), tensile strength and rupture elongation at 23° C. and 50% RH.

(2) Permanent elongation: A test piece was produced in compliance with JIS-K7312, target lines were marked for an interval length $L_0$, and the test piece was placed in a tensile tester (Orientec, Tensilon UCT-5T) followed by holding for 10 minutes while stretching the test piece to 100% elongation at 23° C. and 50% RH. Next, after allowing the stretched test piece to rapidly contract without springing back (return speed: 500 mm/min), the test piece was removed from the chuck and allowed to stand in air for 24 hours at room temperature followed by measurement of the interval length L (where the length prior to stretching is taken to be $L_0$) and calculation of permanent elongation of the test piece from the equation below. A value of 40 mm was used for L0 in this measurement:

$$\text{Permanent elongation(\%)} = [(L-L_0)/L_0] \times 100.$$

(3) Refractive index: Refractive index was measured by irradiating a sample with e rays (λ=546 nm) using refractometer (Adago, Abbe Refractometer: MR-04).

(4) Abbe number ($v_e$): Refractive indices were respectively measured when a sample was irradiated with e rays (λ=546 nm), F' rays (λ=480 nm) and C' rays (λ=644 nm) using the aforementioned refractometer, and the Abbe number was calculated according to the equation below:

$$v_e = (n_e - 1)/(n_{F'} - n_{C'}).$$

EXAMPLE 1

Production of Polythiocarbonate Polythiol A 166 g (1.10 moles) of 1,6-hexane dithiol, 156 g (0.728 moles) of diphenyl carbonate and 0.860 g (0.331 millimoles) of 10 wt % tetrabutyl ammonium hydroxide-methanol solution (catalyst) were charged into a glass reactor having an internal volume of 500 ml and equipped with a stirrer, thermometer and distillation column (provided with a fractionation tube, reflux head and condenser at the top of the column), followed by holding this mixed solution for 2 hours under conditions of 27 kPa (200 mmHg) and 160° C. while refluxing. Next, after gradually reducing the pressure to 6.7 kPa (50 mmHg) over the course of 8 hours while distilling off phenol, the pressure was gradually reduced from 4.0 kPa (30 mmHg) to 2.0 kPa (15 mmHg) over the course of 3 hours once the phenol was no longer distilled off followed by allowing to further react while distilling off the mixture of 1,6-hexane dithiol and phenol to obtain the target polythiocarbonate polythiol compound.

The measurement results of $^1$H-NMR (in deuterium-containing chloroform, to apply similarly hereinafter) of the resulting polythiocarbonate polythiol are shown below:

$^1$H-NMR: 1.33 ppm (t, J=7.3 Hz, SH), 1.39 ppm (m, CH$_2$), 1.62 ppm (m, CH$_2$), 2.52 ppm (q, J=7.3 Hz, CH$_2$SH), 2.53 ppm (q, J=7.3 Hz, CH$_2$SH), 2.97 ppm (t, J=7.3 Hz, CH$_2$SCO), 2.98 ppm (t, J=7.3 Hz, CH$_2$SCO).

An equimolar amount of p-toluene sulfonic acid monohydrate as the aforementioned catalyst was added to this polythiocarbonate polythiol to deactivate the catalyst by stirring for 2 hours at 13 kPa (100 mmHg) and 130° C. Next, 430 g of methylene chloride were added, the polythiocarbonate polythiol compound was dissolved therein, and after washing the resulting solution three times with an equal volume of water, the solution was dried with anhydrous magnesium sulfate, the solid matter contained therein was filtered out, and the methylene chloride was distilled off. The physical properties of the ultimately obtained polythiocarbonate polythiol (A) are shown in Table 2. Furthermore, the SH value (200.3 mgKOH/g) agreed with the results of $^1$H-NMR measurement.

Production of Polythiourethane 39.70 g (70.88 millimoles) of the aforementioned polythiocarbonate polythiol A were completely dissolved at 70° C. in 157 g of dimethyl acetoamide in a glass reactor having an internal volume of 300 ml and equipped with a stirrer, thermometer and condenser, followed by the addition of 12.38 g (71.08 millimoles) of 2,4-tolylene diisocyanate at the above-mentioned temperature and allowing to react for 3 hours. 0.390 g (2.24 millimoles) of 2,4-tolylene diisocyanate were further added to the resulting reaction solution and allowed to react at 80° C., followed by stopping the reaction when a rise in viscosity could no longer be observed in the reaction solution (after 4 hours). The final viscosity of the solution was 20.7 Pa·sec at 50° C.

After heating the resulting solution (polythiourethane solution) to 60° C., the solution was cast on a releasable glass substrate followed by heat treatment for 2 hours at 60° C. and then for 3 hours at 110° C. to obtain a film (I) having a thickness of about 200 µm. The physical properties of this film (I) are shown in Table 4.

COMPARATIVE EXAMPLE 1

Production of Polythiourethane 20.42 g (135.9 millimoles) of 1,6-hexane dithiol were completely dissolved at 35° C. in 180 g of dimethyl acetoamide in the same type of reactor as Example 1, 23.66 g (135.9 millimoles) of 2,4-tolylene diisocyanate were added to this solution at the aforementioned temperature, and the resulting reaction solution was allowed to react for 3 hours while holding at a temperature of 70° C. Next, 0.690 g (3.96 millimoles) of 2,4-tolylene diisocyanate were further added to this solution and allowed to react at 80° C. The reaction was stopped when a rise in viscosity could no longer be observed in the reaction solution (after 8 hours). The final viscosity of the solution was 20.3 Pa·sec at 50° C.

The resulting solution (polythiourethane solution) was treated in the same manner as Example 1 to produce a film (II) having a thickness of about 200 µm. The physical properties of this film (II) are shown in Table 4.

COMPARATIVE EXAMPLE 2

Production of Polyurethane 39.90 g (79.98 millimoles) of polycarbonate diol (UH-CARB50, Ube Industries, hydroxyl value: 224.9 mgKOH/g) were completely dissolved at 70° C. in 162 g of dimethyl acetoamide in the same type of reactor as Example 1 followed by the addition of 13.93 g (79.98 millimoles) of 2,4-tolylene diisocyanate to this solution at the aforementioned temperature and allowing to react for 5 hours. 0.400 g (2.30 millimoles) of 2,4-tolylene diisocyanate were further added to the resulting solution and allowed to react at 80° C. The reaction was stopped when a rise in viscosity was virtually no longer observed in the reaction solution (after 10 hours). The final viscosity of the solution was 9.8 Pa·sec at 50° C.

The resulting solution (polyurethane solution) was treated in the same manner as Example 1 to produce a film (III) having a thickness of about 200 µm. The physical properties of this film (III) are shown in Table 4.

EXAMPLE 2

Production of Polythiocarbonate Polythiol B 163 g (1.05 moles) of 2-mercaptoethyl sulfide, 156 g (0.726 moles) of diphenyl carbonate and 0.856 g (0.330 millimoles) of 10 wt % tetrabutyl ammonium hydroxide-methanol solution (catalyst) were charged into the same type of reactor as Example 1, followed by holding this mixed solution for 1 hour under conditions of 27 kPa (200 mmHg) and 160° C. while refluxing. After gradually reducing the pressure to 4.0 kPa (30 mmHg) over the course of 4 hours while distilling off phenol, the pressure was gradually reduced from 2.7 kPa (20 mmHg) to 0.93 kPa (7 mmHg) over the course of 1.5 hours after the phenol was no longer distilled off followed by allowing the reaction to proceed while distilling off 2-mercaptoethyl sulfide and phenol by further holding at a pressure of 0.93 kPa (7 mmHg) for 3 hours to produce the target polythiocarbonate polythiol.

The measurement results of $^1$H-NMR (in deuterium-containing chloroform) of the resulting polythiocarbonate polythiol are shown below:

$^1$H-NMR: 1.73 ppm (t, J=7.9 Hz, SH), 1.75 ppm (t, J=7.9 Hz, SH), 2.78 ppm (m, CH$_2$SCH$_2$ and CH$_2$SH), 3.19 ppm (t, J=7.9 Hz, CH$_2$SCO), 3.20 ppm (t, J=7.9 Hz, CH$_2$SCO).

The catalyst in the aforementioned polythiocarbonate polythiol was deactivated in the same manner as Example 1. The physical properties of the ultimately obtained polythiocarbonate polythiol (B) are shown in Table 2.

Production of Polythiourethane 39.83 g (63.74 millimoles) of the aforementioned polythiocarbonate polythiol (B) were completely dissolved at 70° C. in 153 g of dimethyl acetoamide in the same type of reactor as Example 1, followed by the addition of 11.08 g (63.62 millimoles) of 2,4-tolylene diisocyanate at the above-mentioned temperature and allowing it to react for 3 hours. 0.330 g (1.89 millimoles) of 2,4-tolylene diisocyanate were further added to the resulting reaction solution and allowed to react at 80° C. The reaction was stopped when a rise in viscosity was virtually no longer observed in the reaction solution (after 3 hours). The final viscosity of the solution was 13.3 Pa·sec at 50° C.

The resulting solution (polythiourethane solution) was treated in the same manner as Example 1 to produce a film (IV) having a thickness of about 200 µm. The physical properties of this film (IV) are shown in Table 4.

COMPARATIVE EXAMPLE 3

Production of Polythiourethane 19.22 g (124.5 millimoles) of 2-mercaptoethyl sulfide were completely dissolved at 35° C. in 162 g of dimethyl acetoamide in the same type of reactor as Example 1, 21.69 g (124.5 millimoles) of 2,4-tolylene diisocyanate were added to this solution at the aforementioned temperature, and the resulting reaction solution was allowed to react for 3 hours while holding at a temperature of 70° C. Next, 0.650 g (3.73 millimoles) of 2,4-tolylene diisocyanate were further added to the resulting reaction solution and allowed to react at 80° C. The reaction was stopped when a rise in viscosity was virtually no longer observed in the reaction solution (after 12 hours). The final viscosity of the solution was 50.1 Pa·sec at 50° C.

The resulting solution (polythiourethane solution) was treated in the same manner as Example 1 to produce a film (V) having a thickness of about 200 μm. The physical properties of this film (V) are shown in Table 4.

EXAMPLE 3

Production of Polythiocarbonate Polythiol (C)

90.1 g (0.599 moles) of 1,6-hexane dithiol, 77.2 g (0.500 moles) of 2-mercaptoethyl sulfide, 155 g (0.725 moles) of diphenyl carbonate and 0.861 g (0.332 millimoles) of 10 wt % tetrabutyl ammonium hydroxide-methanol solution were charged into the same type of reactor as Example 1, followed by holding the resulting mixed solution for 1 hour under conditions of 27 kPa (200 mmHg) and 160° C. while refluxing. After gradually reducing the pressure to 4.0 kPa (30 mmHg) over the course of 4 hours while distilling off phenol from the resulting reaction solution, the pressure was gradually reduced from 2.7 kPa (20 mmHg) to 0.93 kPa (7 mmHg) over the course of 1.5 hours after the phenol was no longer distilled off followed by allowing the reaction to proceed while distilling off a mixture of phenol, 1,6-hexane dithiol and 2-mercaptoethyl sulfide by further holding at a pressure of 0.93 kPa (7 mmHg) for 3 hours to produce the target polythiocarbonate polythiol.

The measurement results of $^1$H-NMR of the resulting polythiocarbonate polythiol are shown below:

$^1$H-NMR: 1.33 ppm (t, J=7.3 Hz, SH), 1.39 ppm (m, CH$_2$), 1.62 ppm (m, CH$_2$), 1.74 ppm (m, 5H), 2.52 ppm (m, CH$_2$SH), 2.78 ppm (m, CH$_2$SCH$_2$ and CH$_2$SH), 2.97 ppm (m, CH$_2$SCO), 3.19 ppm (m, CH$_2$SCO).

The catalyst in the aforementioned polythiocarbonate polythiol was deactivated in the same manner as Example 1 followed by addition of methylene chloride, washing, drying, filtering and distilling off the methylene chloride. The physical properties of the ultimately obtained polythiocarbonate polythiol (C) are shown in Table 2.

Production of Polythiourethane (1)

40.21 g (76.74 millimoles) of the aforementioned polythiocarbonate polythiol (C) were completely dissolved at 70° C. in 161 g of dimethyl acetoamide in the same type of reactor as Example 1, followed by the addition of 13.40 g (76.94 millimoles) of 2,4-tolylene diisocyanate to the resulting solution at the above-mentioned temperature and allowing to react for 3 hours. 0.370 g (2.12 millimoles) of 2,4-tolylene diisocyanate were further added to the resulting reaction solution and allowed to react at 80° C. The reaction was stopped when a rise in viscosity was virtually no longer observed in the reaction solution (after 3 hours). The final viscosity of the solution was 10.3 Pa·sec at 50° C.

The resulting solution (polythiourethane solution) was treated in the same manner as Example 1 to produce a film (VI) having a thickness of about 200 μm. The physical properties of this film (VI) are shown in Table 4.

Production of Polythiourethane (2)

33.61 g (64.14 millimoles) of the aforementioned polythiocarbonate polythiol (C) and 3.280 g (21.25 millimoles) of 2-mercaptoethyl sulfide were completely dissolved at 70° C. in 161 g of dimethyl acetoamide in the same type of reactor as Example 1, followed by the addition of 18.98 g (85.39 millimoles) of isophorone diisocyanate at this temperature and allowing it to react for 1 hour. Next, 0.153 g (0.242 millimoles) of dibutyl tin dilaurate were injected into this reaction solution, and after allowing it to react for 3 hours at the same temperature, 0.570 g (2.56 millimoles) of isophorone diisocyanate were further added and allowed to react at 80° C., followed by stopping the reaction when a rise in viscosity could no longer be observed in the reaction solution (after 4 hours). The final viscosity of the solution was 18.9 Pa·sec at 50° C.

The resulting solution (polythiourethane solution) was treated in the same manner as Example 1 to produce a film (VII) having a thickness of about 200 μm. The physical properties of this film (VII) are shown in Table 4.

COMPARATIVE EXAMPLE 4

Production of Polythiocarbonate Polythiol (D)

105 g (0.700 moles) of 1,6-hexane dithiol, 61.7 g (0.400 moles) of 2-mercaptoethyl sulfide, 155 g (0.725 moles) of diphenyl carbonate and 0.861 g (0.332 millimoles) of 10 wt % tetrabutyl ammonium hydroxide-methanol solution were charged into the same type of reactor as Example 1, followed by holding the resulting mixed solution for 1 hour under conditions of 27 kPa (200 mmHg) and 160° C. while refluxing. After gradually reducing the pressure to 4.0 kPa (30 mmHg) over the course of 4 hours while distilling off phenol from the resulting reaction solution, the pressure was gradually reduced from 2.7 kPa (20 mmHg) to 0.93 kPa (7 mmHg) over the course of 1.5 hours after the phenol was no longer distilled off, followed by distilling off a mixture of phenol, 1,6-hexane dithiol and 2-mercaptoethyl sulfide by further holding it at a pressure of 0.93 kPa (7 mmHg) for 3 hours. Continuing, the reaction was allowed to proceed while distilling off a mixture of 1,6-hexane dithiol and 2-mercaptoethyl sulfide over the course of 5 hours at 0.93 to 0.67 kPa (7-5 mmHg) to produce a polythiocarbonate polythiol.

The measurement results of $^1$H-NMR of the resulting polythiocarbonate polythiol are shown below:

$^1$H-NMR: 1.33 ppm (t, J=7.3 Hz, SH), 1.39 ppm (m, CH$_2$), 1.62 ppm (m, CH$_2$), 1.74 ppm (m, 5H), 2.52 ppm (m, CH$_2$SH), 2.78 ppm (m, CH$_2$SCH$_2$ and CH$_2$SH), 2.97 ppm (m, CH$_2$SCO), 3.19 ppm (m, CH$_2$SCO).

The catalyst in the aforementioned polythiocarbonate polythiol was deactivated in the same manner as Example 1 followed by addition of methylene chloride, washing, drying, filtering and distilling off the methylene chloride. The physical properties of the ultimately obtained polythiocarbonate polythiol (D) are shown in Table 2. Furthermore, the SH value (40.88 mgKOH/g) agreed with the results of $^1$H-NMR measurement.

Production of Polythiourethane 30.69 g (11.18 millimoles) of the aforementioned polythiocarbonate polythiol (D) were completely dissolved at 70° C. in 101 g of dimethyl acetoamide in the same type of reactor as Example 1, followed by the addition of 1.95 g (11.2 millimoles) of 2,4-tolylene diisocyanate to the resulting solution at the above-mentioned temperature and allowing it to react for 3 hours. 0.060 g (0.34 millimoles) of 2,4-tolylene diisocyanate were further added to the resulting reaction solution and allowed to react at 80° C. The reaction was stopped when a rise in viscosity could no longer be observed in the reaction solution (after 4 hours). The final viscosity of the solution was 9.8 Pa·sec at 50° C.

The resulting solution (polythiourethane solution) was treated in the same manner as Example 1 to produce a film having a thickness of about 200 μm. However, when the formed film was peeled from the glass substrate, the film did not returning to its original form after stretching (namely, the film had low tensile strength and low shape recovery). In addition, as the film was cloudy, the optical properties thereof could not be measured.

Furthermore, this polythiourethane was crystalline and was observed to have a melting point (40.8° C.). The measurement method was the same as that previously described.

EXAMPLE 4

Production of Polythiocarbonate Polythiol (E)

114 g (0.761 moles) of 1,6-hexane dithiol, 76.7 g (0.435 moles) of 1,4-bis(mercaptomethyl) cyclohexane, 160 g (0.747 moles) of diphenyl carbonate and 0.908 g (0.350 millimoles) of 10 wt % tetrabutyl ammonium hydroxide-methanol solution were charged into the same type of reactor as Example 1, followed by holding the resulting mixed solution for 1 hour under conditions of 27 kPa (200 mmHg) and 160° C. while refluxing. The pressure of the resulting reaction solution was gradually reduced to 4.0 kPa (30 mmHg) over the course of 4 hours while distilling off phenol from the resulting reaction solution. The pressure was gradually reduced from 2.7 kPa (20 mmHg) to 0.93 kPa (7 mmHg) over the course of 1.5 hours after the phenol was no longer distilled off followed by allowing the reaction to proceed while distilling off a mixture of phenol, 1,6-hexane dithiol and 1,4-bis(mercaptomethyl) cyclohexane by further holding at a pressure of 0.93 kPa (7 mmHg) for 3 hours to produce the target polythiocarbonate polythiol.

The measurement results of $^1$H-NMR of the resulting polythiocarbonate polythiol are shown below:

$^1$H-NMR: 0.98 ppm (m, $CH_2$), 1.26-1.50 ppm (m, SH and $CH_2$), 1.62 ppm ((m, $CH_2$), 1.70 ppm ((m, $CH_2$), 1.87 ppm (m, CH and $CH_2$), 2.41 ppm (t, J=7.3 Hz, $CH_2SH$), 2.42 ppm (t, J=7.3 Hz, $CH_2SH$), 2.52 ppm (m, $CH_2SH$), 2.89 ppm (m, $CH_2SCO$), 2.98 ppm (m, $CH_2SCO$).

The catalyst in the aforementioned polythiocarbonate polythiol was deactivated in the same manner as Example 1 followed by addition of methylene chloride, washing, drying, filtering and distilling off the methylene chloride. The physical properties of the ultimately obtained polythiocarbonate polythiol (E) are shown in Table 2. Furthermore, the SH value (208.4 mgKOH/g) agreed with the results of $^1$H-NMR measurement.

EXAMPLE 5

Production of Polythiocarbonate Polythiol (F)

49.8 g (0.331 moles) of 1,6-hexane dithiol, 40.2 g (0.189 moles) of 2,5-bis(mercaptomethyl)-1,4-dithiane, 67.5 g (0.315 moles) of diphenyl carbonate and 0.423 g (0.163 millimoles) of 10 wt % tetrabutyl ammonium hydroxide-methanol solution were charged into the same type of reactor as Example 1, followed by holding the resulting mixed solution for 1 hour under conditions of 27 kPa (200 mmHg) and 160° C. while refluxing. The pressure of the resulting reaction solution was gradually reduced to 4.0 kPa (30 mmHg) over the course of 4 hours while distilling off phenol from the resulting reaction solution. The pressure was gradually reduced from 2.7 kPa (20 mmHg) to 0.93 kPa (7 mmHg) over the course of 1.5 hours after the phenol was no longer distilled off followed by allowing the reaction to proceed while distilling off a mixture of phenol, 1,6-hexane dithiol and 2,5-bis(mercaptomethyl)-1,4-dithane by further holding at a pressure of 0.93 kPa (7 mmHg) for 3 hours to produce the target polythiocarbonate polythiol.

The measurement results of $^1$H-NMR of the resulting polythiocarbonate polythiol are shown below:

$^1$H-NMR: 1.33 ppm (t, J=7.3 Hz, SH), 1.39 ppm (m, $CH_2$), 1.62 ppm (m, $CH_2$ and SH), 2.52 ppm (q, J=7.3 Hz, $CH_2SH$), 2.53 ppm (q, J=7.3 Hz, $CH_2SH$), 3.00 ppm (m, $CH_2SCH$, CH, $CH_2SH$ and $CH_2SCO$), 3.36 ppm (m, $CH_2SCO$).

The catalyst in the aforementioned polythiocarbonate polythiol was deactivated in the same manner as Example 1 followed by addition of methylene chloride, washing, drying, filtering and distilling off the methylene chloride. The physical properties of the ultimately obtained polythiocarbonate polythiol (F) are shown in Table 2. Furthermore, the SH value (194.9 mgKOH/g) agreed with the results of $^1$H-NMR measurement.

EXAMPLE 6

Production of Polythiocarbonate Polythiol (G)

135 g (0.900 moles) of 1,6-hexane dithiol, 116 g (0.753 moles) of 2-mercaptoethyl sulfide, 233 g (1.09 moles) of diphenyl carbonate and 1.29 g (0.498 millimoles) of 10 wt % tetrabutyl ammonium hydroxide-methanol solution were charged into the same type of reactor as Example 1, followed by distilling off a mixture of phenol, 1,6-hexane dithiol and 2-mercaptoethyl sulfide by carrying out the same procedure as Example 2 on the resulting mixed solution. Continuing, the reaction was carried out while distilling off a mixture of 1,6-hexane dithiol and 2-mercaptoethyl sulfide over the course of 1 hour at 0.27 kPa (2 mmHg) to obtain the target polythiocarbonate polythiol.

The measurement results of $^1$H-NMR of the resulting polythiocarbonate polythiol are shown below:

$^1$H-NMR: 1.33 ppm (t, J=7.3 Hz, SH), 1.39 ppm (m, $CH_2$), 1.62 ppm (m, $CH_2$), 1.74 ppm (m, 5H), 2.52 ppm (m, $CH_2SH$), 2.78 ppm (m, $CH_2SCH_2$ and $CH_2SH$), 2.97 ppm (m, $CH_2SCO$), 3.19 ppm (m, $CH_2SCO$).

The catalyst in the aforementioned polythiocarbonate polythiol was deactivated in the same manner as Example 1 followed by addition of methylene chloride, washing, drying, filtering and distilling off the methylene chloride. The physical properties of the ultimately obtained polythiocarbonate polythiol (G) are shown in Table 2. Furthermore, the SH value (96.74 mgKOH/g) agreed with the results of $^1$H-NMR measurement.

Production of Polythiourethane (1)

30.17 g (26.01 millimoles) of the aforementioned polythiocarbonate polythiol (G) and 3.230 g (20.93 millimoles) of 2-mercaptoethyl sulfide were completely dissolved at 70° C. in 124 g of dimethyl acetoamide in the same type of reactor as Example 1, followed by the addition of 8.180 g (46.97 millimoles) of 2,4-tolylene diisocyanate at the above-mentioned temperature and allowing to react for 3 hours. Next, 0.240 g (1.38 millimoles) of 2,4-tolylene diisocyanate were further added to this reaction solution and allowed to react at 80° C., followed by stopping the reaction when a rise in viscosity was virtually no longer observed in the reaction solution (after 4 hours). The final viscosity of the solution was 21.2 Pa·sec at 50° C.

The resulting solution (polythiourethane solution) was treated in the same manner as Example 1 to produce a film (VIII) having a thickness of about 200 μm. The physical properties of this film (VIII) are shown in Table 4.

Production of Polythiourethane (2)

21.08 g (18.17 millimoles) of the aforementioned polythiocarbonate polythiol (G) and 24.94 g (46.32 millimoles) of polythiocarbonate polythiol (E) were completely dissolved at 70° C. in 172 g of dimethyl acetoamide in the same type of reactor as Example 1, followed by the addition of 11.20 g (64.31 millimoles) of 2,4-tolylene diisocyanate at this temperature and allowing to react for 3 hours. Next, 0.330 g (1.89 millimoles) of 2,4-tolylene diisocyanate were further added to this reaction solution and allowed to react at 80° C., followed by stopping the reaction when a rise in viscosity was virtually no longer observed in the reaction solution (after 4 hours). The final viscosity of the solution was 20.5 Pa·sec at 50° C.

The resulting solution (polythiourethane solution) was treated in the same manner as Example 1 to produce a film (IX) having a thickness of about 200 μm. The physical properties of this film (IX) are shown in Table 4.

EXAMPLE 7

Production of Polythiocarbonate Polythiol (H)

105 g (0.700 moles) of 1,6-hexane dithiol, 61.7 g (0.400 moles) of 2-mercaptoethyl sulfide, 155 g (0.725 moles) of diphenyl carbonate and 0.861 g (0.332 millimoles) of 10 wt % tetrabutyl ammonium hydroxide-methanol solution were charged into the same type of reactor as Example 1, followed by distilling off a mixture of phenol, 1,6-hexane dithiol and 2-mercaptoethyl sulfide by carrying out the same procedure as Example 2 on the resulting mixed solution. Continuing, the reaction was carried out while distilling off a mixture of 1,6-hexane dithiol and 2-mercaptoethyl sulfide over the course of 3 hours at 0.93 to 0.67 kPa (7 to 5 mmHg) to obtain the target polythiocarbonate polythiol.

The measurement results of $^1$H-NMR of the resulting polythiocarbonate polythiol are shown below:

$^1$H-NMR: 1.33 ppm (t, J=7.3 Hz, SH), 1.39 ppm (m, $CH_2$), 1.62 ppm (m, $CH_2$), 1.74 ppm (m, 5H), 2.52 ppm (m, $CH_2SH$), 2.78 ppm (m, $CH_2SCH_2$ and $CH_2SH$), 2.97 ppm (m, $CH_2SCO$), 3.19 ppm (m, $CH_2SCO$).

The catalyst in the aforementioned polythiocarbonate polythiol was deactivated in the same manner as Example 1 followed by addition of methylene chloride, washing, drying, filtering and distilling off the methylene chloride. The physical properties of the ultimately obtained polythiocarbonate polythiol (H) are shown in Table 2. Furthermore, the SH value (59.29 mgKOH/g) agreed with the results of $^1$H-NMR measurement.

Production of Polythiourethane (1)

21.20 g (11.21 millimoles) of the aforementioned polythiocarbonate polythiol (H) and 9.870 g (63.95 millimoles) of 2-mercaptoethyl sulfide were completely dissolved at 70° C. in 133 g of dimethyl acetoamide in the same type of reactor as Example 1, followed by the addition of 13.09 g (75.16 millimoles) of 2,4-tolylene diisocyanate at this temperature and allowing to react for 3 hours. Next, 0.390 g (2.24 millimoles) of 2,4-tolylene diisocyanate were further added to this reaction solution and allowed to react at 80° C., followed by stopping the reaction when a rise in viscosity could no longer be observed in the reaction solution (after 4 hours). The final viscosity of the solution was 17.8 Pa·sec at 50° C.

The resulting solution (polythiourethane solution) was treated in the same manner as Example 1 to produce a film (X) having a thickness of about 200 μm. The physical properties of this film (VIII) are shown in Table 4.

Production of Polythiourethane (2)

23.50 g (40.82 millimoles) of the aforementioned polythiocarbonate polythiol (F), 20.76 g (10.97 millimoles) of polythiocarbonate polythiol (H) and 1.440 g (9.330 millimoles) of 2-mercaptoethyl sulfide were completely dissolved at 70° C. in 170 g of dimethyl acetoamide in the same type of reactor as Example 1, followed by the addition of 10.64 g (61.09 millimoles) of 2,4-tolylene diisocyanate at this temperature and allowing to react for 3 hours. Next, 0.320 g (1.84 millimoles) of 2,4-tolylene diisocyanate were further added to this reaction solution and allowed to react at 80° C., followed by stopping the reaction when a rise in viscosity could no longer be observed in the reaction solution (after 4 hours). The final viscosity of the solution was 19.1 Pa·sec at 50° C.

The resulting solution (polythiourethane solution) was treated in the same manner as Example 1 to produce a film (XI) having a thickness of about 200 μm. The physical properties of this film (XI) are shown in Table 4.

EXAMPLE 8

Production of Polythiocarbonate Polythiol (I)

167 g (0.949 moles) of 1,4-bis(mercaptomethyl) cyclohexane, 131 g (0.616 moles) of diphenyl carbonate and 0.870 g (0.335 millimoles) of 10 wt % tetrabutyl ammonium hydroxide-methanol solution were charged into the same type of reactor as Example 1, followed by reacting while distilling off a mixture of phenol and 1,4-bis(mercaptomethyl) cyclohexane by carrying out the same procedure as Example 2 on the resulting mixed solution to obtain the target polythiocarbonate polythiol.

The measurement results of $^1$H-NMR of the resulting polythiocarbonate polythiol are shown below:

$^1$H-NMR: 0.96 ppm (m, $CH_2$), 1.29 ppm (t, J=8.0 Hz, SH), 1.30 ppm (t, J=8.0 Hz, SH), 1.32-1.50 ppm (m, $CH_2$), 1.57 ppm (m, $CH_2$), 1.70 ppm (m, $CH_2$), 1.86 ppm (m, CH and $CH_2$), 2.41 ppm (t, J=8.0 Hz, $CH_2SH$), 2.42 ppm (t, J=8.0 Hz, $CH_2SH$), 2.49 ppm (t, J=8.0 Hz, $CH_2SH$), 2.50 ppm (t, J=8.0 Hz, $CH_2SH$), 2.89 ppm (m, $CH_2SCO$), 2.97 ppm (m, $CH_2SCO$).

The catalyst in the aforementioned polythiocarbonate polythiol was deactivated in the same manner as Example 1 followed by addition of methylene chloride, washing, drying, filtering and distilling off the methylene chloride. The physical properties of the ultimately obtained polythiocarbonate polythiol (I) are shown in Table 2. Furthermore, the SH value (209.9 mgKOH/g) agreed with the results of $^1$H-NMR measurement.

Production of Polythiourethane 16.48 g (30.83 millimoles) of the aforementioned polythiocarbonate polythiol (1) and 28.80 g (24.83 millimoles) of polythiocarbonate polythiol (G) were completely dissolved at 90° C. in 167 g of dimethyl acetoamide in the same type of reactor as Example 1, followed by the addition of 9.700 g (55.70 millimoles) of 2,4-tolylene diisocyanate at this temperature and allowing to react for 3 hours. Next, 0.290 g (1.67 millimoles) of 2,4-tolylene diisocyanate were further added to this reaction solution and allowed to react at 90° C., followed by stopping the reaction when a rise in viscosity could no longer be observed in the reaction solution (after 3 hours). The final viscosity of the solution was 25.6 Pa·sec at 50° C.

The resulting solution (polythiourethane solution) was treated in the same manner as Example 1 to produce a film (XII) having a thickness of about 200 μm. The physical properties of this film (XII) are shown in Table 4.

EXAMPLE 9

Production of Polythiocarbonate Polythiol (J)

212 g (1.41 moles) of 1,6-hexane dithiol, 201 g (0.936 moles) of diphenyl carbonate and 1.15 g (0.444 millimoles) of 10 wt % tetrabutyl ammonium hydroxide-methanol solution were charged into the same type of reactor as Example 1, followed by distilling off a mixture of phenol and 1,6-hexane dithiol by carrying out the same procedure as Example 2 on the resulting mixed solution. Continuing, after reacting while distilling off 1,6-hexane dithiol over the course of 5 hours at 0.27 kPa (2 mmHg), 37.0 g (0.342 moles) of 1,3-propane dithiol were added and reacted for 6 hours under normal pressure to obtain the target polythiocarbonate polythiol.

The measurement results of $^1$H-NMR of the resulting polythiocarbonate polythiol are shown below:

$^1$H-NMR: 1.31 ppm (t, J=7.3 Hz, SH), 1.39 ppm (m, CH$_2$), 1.61 ppm (m, CH$_2$), 1.92 ppm (quin., J=7.3 Hz, CH$_2$), 1.94 ppm (quin., J=7.3 Hz, CH$_2$), 2.52 ppm (q, J=7.3 Hz, CH$_2$SH), 2.53 ppm (a, J=7.3 Hz, CH$_2$SH), 2.60 ppm (q, J=7.3 Hz, CH$_2$SH), 2.66 ppm (q, J=7.3 Hz, CH$_2$SH), 2.97 ppm (t, J=7.3 Hz, CH$_2$SCO), 2.98 ppm (t, J=7.3 Hz, CH$_2$SCO), 3.04 ppm (t, J=7.3 Hz, CH$_2$SCO), 3.11 ppm (t, J=7.3 Hz, CH$_2$SCO).

The catalyst in the aforementioned polythiocarbonate polythiol was deactivated in the same manner as Example 1 followed by addition of methylene chloride, washing, drying, filtering and distilling off the methylene chloride. The physical properties of the ultimately obtained polythiocarbonate polythiol (J) are shown in Table 2. Furthermore, the SH value (215.2 mgKOH/g) agreed with the results of $^1$H-NMR measurement.

Production of Polythiourethane 30.73 g (58.94 millimoles) of the aforementioned polythiocarbonate polythiol (J) and 3.610 g (23.39 millimoles) of 2-mercaptoethyl sulfide were completely dissolved at 70° C. in 147 g of dimethyl acetoamide in the same type of reactor as Example 1, followed by the addition of 14.34 g (82.34 millimoles) of 2,4-tolylene diisocyanate at this temperature and allowing it to react for 3 hours. Next, 0.430 g (2.47 millimoles) of 2,4-tolylene diisocyanate were further added to this reaction solution and allowed to react at 80° C., followed by stopping the reaction when a rise in viscosity was virtually no longer observed in the reaction solution (after 4 hours). The final viscosity of the solution was 11.2 Pa·sec at 50° C.

The resulting solution (polythiourethane solution) was treated in the same manner as Example 1 to produce a film (XIII) having a thickness of about 200 μm. The physical properties of this film (XIII) are shown in Table 4.

EXAMPLE 10

Production of Polythiocarbonate Polythiol (K)

93.4 g (0.622 moles) of 1,6-hexane dithiol, 93.4 g (0.622 moles) of 3-methyl-1,5-pentane dithiol, 182 g (0.850 moles) of diphenyl carbonate and 3.07 g (1.18 millimoles) of 10 wt % tetrabutyl ammonium hydroxide-methanol solution were charged into the same type of reactor as Example 1, followed by reacting while distilling off a mixture of phenol, 1,6-hexane dithiol and 3-methyl-1,5-pentane dithiol by carrying out the same procedure as Example 2 on the resulting mixed solution to obtain the target polythiocarbonate polythiol.

The measurement results of $^1$H-NMR of the resulting polythiocarbonate polythiol are shown below:

$^1$H-NMR: 0.92 ppm (d, J=7.5 Hz, CH$_3$), 0.95 ppm (d, J=7.5 Hz, CH$_3$), 1.33 ppm (t, J=7.5 Hz, SH), 1.39 ppm (m, CH$_2$), 1.49 ppm (m, CH), 1.62 ppm (m, CH$_2$), 2.52 ppm (t, J=7.5 Hz, CH$_2$SH), 2.53 ppm (t, J=7.5 Hz, CH$_2$SH), 2.97 ppm (m, CH$_2$SCO).

The catalyst in the aforementioned polythiocarbonate polythiol was deactivated in the same manner as Example 1 followed by addition of methylene chloride, washing, drying, filtering and distilling off the methylene chloride. The physical properties of the ultimately obtained polythiocarbonate polythiol (K) are shown in Table 2. Furthermore, the SH value (173.4 mgKOH/g) agreed with the results of $^1$H-NMR measurement.

Production of Polythiourethane 30.00 g (46.36 millimoles) of the aforementioned polythiocarbonate polythiol (K) and 2.390 g (15.49 millimoles) of 2-mercaptoethyl sulfide were completely dissolved at 70° C. in 129 g of dimethyl acetoamide in the same type of reactor as Example 1, followed by the addition of 10.76 g (61.78 millimoles) of 2,4-tolylene diisocyanate at this temperature and allowing to react for 3 hours. Next, 0.320 g (1.84 millimoles) of 2,4-tolylene diisocyanate were further added to this reaction solution and allowed to react at 80° C., followed by stopping the reaction when a rise in viscosity could no longer be observed in the reaction solution (after 4 hours). The final viscosity of the solution was 10.1 Pa·sec at 50° C.

The resulting solution (polythiourethane solution) was treated in the same manner as Example 1 to produce a film (XIV) having a thickness of about 200 μm. The physical properties of this film (XIV) are shown in Table 4.

Furthermore, Table 1 shows the polythiol compounds used as production raw materials of the polythiocarbonate polythiols, while Table 3 shows the respective polythiol components and chain lengtheners which compose the polythiourethanes. In Table 3, the isocyanate component is isophorone diisocyanate only in the case of film no. (VII), and is 2,4-tolylene diisocyanate in all other cases.

TABLE 1

| | Symbol | Polythiol Compound |
|---|---|---|
| Example 1 | A | 1,6-hexane dithiol |
| Example 2 | B | 2-mercaptoethyl sulfide |
| Example 3 | C | 1,6-hexane dithiol + 2-mercaptoethyl sulfide |
| Comparative Example 4 | D | 1,6-hexane dithiol + 2-mercaptoethyl sulfide |
| Example 4 | E | 1,6-hexane dithiol + 1,4-bis(mercaptomethyl)cyclohexane |
| Example 5 | F | 1,6-hexane dithiol + 2,5-bis(mercaptomethyl)-1,4-dithiane |
| Example 6 | G | 1,6-hexane dithiol + 2-mercaptoethyl sulfide |
| Example 7 | H | 1,6-hexane dithiol + 2-mercaptoethyl sulfide |
| Example 8 | I | 1,4-bis(mercaptomethyl)cyclohexane |
| Example 9 | J | 1,6-hexane dithiol + 1,3-propane dithiol |
| Example 10 | K | 1,6-hexane dithiol + 3-methyl-1,5-pentane dithiol |

TABLE 2

| Polythiocarbonate polythiol | | SH value (mgKOH/g) | $M_n$ | Acid value (mgKOH/g) | Viscosity (mPa·sec) | Melting point (°C.) | Crystallization temp. (°C.) | Color APHA No. | Terminal-OAr groups | -R-S-R structure content (%) | Residual catalyst (ppm by wt.) |
|---|---|---|---|---|---|---|---|---|---|---|---|
| Ex. 1 | A | 200.3 | 560 | 0.10 | 141 | 57.5 | 37.5 | 10 | <1 | <1 | <2 |
| Ex. 2 | B | 179.5 | 625 | 0.08 | 229 | 85.5 | 54.3 | 10 | <1 | <1 | <2 |
| Ex. 3 | C | 214.1 | 524 | 0.09 | 111 | 13.2 | -9.0 | 10 | <1 | <1 | <2 |
| Comp. Ex. 4 | D | 40.88 | 2745 | 0.05 | 6593 | 39.9 | 6.2 | 10 | <1 | <1 | <2 |
| Ex. 4 | E | 208.4 | 538 | 0.06 | 124 | 24.0 | 0.6 | 10 | <1 | <1 | <2 |
| Ex. 5 | F | 194.9 | 576 | 0.06 | 423 | 15.5 | — | 10 | <1 | <1 | <2 |
| Ex. 6 | G | 96.74 | 1160 | 0.04 | 997 | 29.8 | 2.0 | 10 | <1 | <1 | <2 |
| Ex. 7 | H | 59.29 | 1892 | 0.04 | 2943 | 37.4 | 5.1 | 10 | <1 | <1 | <2 |
| Ex. 8 | I | 209.9 | 536 | 0.07 | 1609 | 90.0 | 64.7 | 10 | <1 | <1 | <2 |
| Ex. 9 | J | 215.2 | 521 | 0.06 | 138 | 36.8 | 7.8 | 10 | <1 | <1 | <2 |
| Ex. 10 | K | 173.4 | 647 | 0.07 | 137 | — | — | 10 | <1 | <1 | <2 |

TABLE 3

Poly(thio)urethane

| | Film No. | Polythiocarbonate polythiol or polycarbonate polyl | Chain lengthener |
|---|---|---|---|
| Example 1 | I | A | — |
| Comp. Ex. 1 | II | — | 1,6-hexane dithiol |
| Comp. Ex. 2 | III | Polycarbonate diol | — |
| Example 2 | IV | B | — |
| Comp. Ex. 3 | V | — | 2-mercaptoethyl sulfide |
| Example 3 | VI | C | — |
| | VII | C | 2-mercaptoethyl sulfide |
| Comp. Ex. 4 | — | D | — |
| Example 4 | — | E | — |
| Example 5 | — | F | — |
| Example 6 | VIII | G | 2-mercaptoethyl sulfide |
| | IX | G + E | — |
| Example 7 | X | H | 2-mercaptoethyl sulfide |
| | XI | H + F | 2-mercaptoethyl sulfide |
| Example 8 | XII | I + G | — |
| Example 9 | XIII | J | 2-mercaptoethyl sulfide |
| Example 10 | XIV | K | 2-mercaptoethyl sulfide |

INDUSTRIAL APPLICABILITY

A polythiourethane has superior optical characteristics in the form of having a high refractive index and low dispersion and superior dynamic performance in the form of demonstrating superior tensile characteristics and high elasticity, and is useful as an optical material of plastic lenses, prisms, optical fibers, substrates for information recording, colored filters, infrared absorbing filters and the like.

The invention claimed is:

1. A polythiocarbonate polythiol comprising a transesterification reaction product of a carbonate compound with a polythiol compound component comprising at least one polythiol compound, and having repeating units represented by the chemical fomula (I):

(I)

TABLE 4

| Poly(thio) urethane film | | Initial modulus of elasticity | Tensile Characteristics | | | | | | Optical Characteristics | |
|---|---|---|---|---|---|---|---|---|---|---|
| | | | Tensile stress (MPa) Elongation | | | Tensile strength (MPa) | Rupture elongation (%) | Permanent elongation (%) | Refractive index | Abbe no. |
| | | | 100% | 200% | 300% | | | | | |
| Ex. 1 | I | 448.3 | 9.85 | 21.47 | 45.00 | 49.28 | 320 | 0 | 1.62 | 32.5 |
| Comp. Ex. 1 | II | 2778.6 | — | — | — | 70.91 | 4 | — | 1.62 | 28.8 |
| Comp. Ex. 2 | III | 13.4 | 1.09 | 1.14 | 1.13 | 3.59 | 540 | 14 | 1.51 | 44.2 |
| Ex. 2 | IV | 365.7 | 6.18 | 10.30 | 16.19 | 18.54 | 310 | 0 | 1.69 | 30.2 |
| Comp. Ex. 3 | V | 2399.2 | — | — | — | 36.36 | 3 | — | 1.66 | 25.4 |
| Ex. 3 | VI | 577.4 | 10.27 | 17.29 | — | 24.98 | 260 | 0 | 1.65 | 31.1 |
| | VII | 791.1 | 19.57 | 26.21 | — | 35.76 | 250 | 0 | 1.62 | 47.1 |
| Ex. 6 | VIII | 158.1 | 2.13 | 4.24 | 8.82 | 11.15 | 360 | 0 | 1.64 | 31.4 |
| | IX | 161.2 | 1.63 | 4.05 | 8.91 | 15.94 | 440 | 0 | 1.63 | 32.0 |
| Ex. 7 | X | 506.7 | 17.97 | 26.57 | — | 32.05 | 240 | 0 | 1.66 | 30.7 |
| | XI | 163.4 | 2.70 | 4.46 | 9.17 | 14.06 | 380 | 0 | 1.64 | 32.8 |
| Ex. 8 | XII | 293.2 | 5.71 | 9.62 | 15.83 | 23.14 | 340 | 0 | 1.63 | 32.8 |
| Ex. 9 | XIII | 619.1 | 14.88 | 29.27 | — | 31.36 | 210 | 0 | 1.64 | 32.2 |
| Ex. 10 | XIV | 273.5 | 7.19 | 10.58 | — | 16.82 | 280 | 0 | 1.63 | 31.8 | in which formula (1), R represents a divalent aliphatic hydrocarbon group having 2 to 14 carbon atoms or a divalent aromatic hydrocarbon group having 6 to 14 carbon atoms, which aliphatic or aromatic hydrocarbon group may have at least one substituent which does not take part in a reaction with the polyisocyante component and the carbon chain in the aliphatic or aromatic hydrocarbon group may include at least one member selected from hetero atoms and an —OCO— group, and the polythiocarbonate polythiol has a number average molecular weight of 200 to 2500.

2. The polythiocarbonate polythiol as claimed in claim 1, wherein the polythiol compound component comprises two or more polythiol compounds different from each other, whereby the polythiocarbonatepolyol include two or more repeating units different from the divalent hydrocarbon groups, represented R in the formula (I).

3. The polythiocarbonate polythiol as claimed in claim 1 or 2, in the state of a liquid at room temperature.

4. The polythiocarbonate polythiol as claimed in claim 1 or 2, having terminal aryl-oxy groups in an amount of 0 to 5 molar % based on the total molar amount of all termial groups.

5. The polythiocarbonate polythiol as claimed in claim 1 or 2, having a color represented by APHA No. 60 or less.

6. The polythiocarbonate polythiol as claimed in claim 1 or 2, wherein the molar content of thioether structures generated by a COS-removal reaction of the thiocarbonate structure portions in the polytbiocarbonate polythiol is 3% or less of the total amount, in moles, of the non-reacted thiocarbonate structures and the generated thioether structures.

7. The polythiocarbonate polythiol as claimed in claim 1 or 2, produced by a transesterification reaction of diphenyl carbonate with a polythiol compound including a divalent hydrocarbon group having 4 to 14 carbon atoms, in the presence of a transesterification catalyst.

8. The polythiocarbonate polythiol as claimed in claim 7, wherein the content for the residual transesterification catalyst is limited to 10 ppm or less, on the basis of the total mass of the resultant polythiocarbonate polythiol.

9. The polythiocarbonate polythiol as claimed in claim 7, wherein the transesterification catalyst comprises a basic component.

* * * * *